(12) United States Patent
Watanabe

(10) Patent No.: US 7,750,241 B2
(45) Date of Patent: Jul. 6, 2010

(54) DISTRIBUTIVE CONDUCTOR

(75) Inventor: Kunihiko Watanabe, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 301 days.

(21) Appl. No.: 11/887,761

(22) PCT Filed: Apr. 28, 2006

(86) PCT No.: PCT/JP2006/309036

§ 371 (c)(1),
(2), (4) Date: Oct. 3, 2007

(87) PCT Pub. No.: WO2006/118273

PCT Pub. Date: Nov. 9, 2006

(65) Prior Publication Data

US 2009/0095525 A1    Apr. 16, 2009

(30) Foreign Application Priority Data

Apr. 28, 2005  (JP) .............................. 2005-132182

(51) Int. Cl.
*H01B 7/00* (2006.01)
(52) U.S. Cl. .............................. 174/110 R; 174/113 R; 174/120 R; 174/36
(58) Field of Classification Search ............ 174/36, 174/110 R, 113 R, 102 R, 108, 113 C
See application file for complete search history.

(56) References Cited

U.S. PATENT DOCUMENTS

| | | | | |
|---|---|---|---|---|
| 2,718,542 A | * | 9/1955 | Lapsley | 174/396 |
| 3,160,702 A | * | 12/1964 | Lapsley | 174/32 |
| 3,170,026 A | | 2/1965 | Woodson | |
| 3,594,492 A | * | 7/1971 | Bahder et al. | 174/36 |
| 3,603,718 A | * | 9/1971 | Gedenk | 174/47 |
| 4,639,544 A | * | 1/1987 | Dableh et al. | 174/32 |
| 5,310,964 A | * | 5/1994 | Roberts et al. | 174/121 A |
| 6,262,375 B1 | * | 7/2001 | Engelhardt et al. | 174/125.1 |
| 6,806,418 B2 | * | 10/2004 | Donazzi et al. | 174/36 |
| 7,094,970 B2 | | 8/2006 | Kihira | |
| 7,241,951 B2 | * | 7/2007 | Donazzi et al. | 174/36 |
| 2004/0099427 A1 | | 5/2004 | Kihira | |

FOREIGN PATENT DOCUMENTS

| | | | |
|---|---|---|---|
| JP | A 51-024533 | | 6/1976 |
| JP | U 5-095091 | | 12/1993 |
| JP | 10-117083 A | * | 11/1996 |
| JP | A 11-298175 | | 10/1999 |
| JP | A 2003-191756 | | 7/2003 |
| JP | A 2003-291745 | | 10/2003 |
| JP | A 2004-171952 | | 6/2004 |
| JP | A 2005-305993 | | 11/2005 |

* cited by examiner

*Primary Examiner*—William H Mayo, III
(74) *Attorney, Agent, or Firm*—Oliff & Berridge, PLC

(57) ABSTRACT

A distributive conductor electromagnetically shields and protects an insulated wire 10 by inserting it into a pipe 20. Heat generated in the insulated wire 10 is absorbed into a low heat-reflective layer 21 of lower heat reflectivity, transferred to the pipe 20, and then dissipated from an outer circumferential wall of the pipe 20 to atmosphere.

5 Claims, 6 Drawing Sheets

US 7,750,241 B2

DISTRIBUTIVE CONDUCTOR

FIELD OF THE INVENTION

The present invention relates to a distributive conductor including a pipe and an insulated wire inserted therein.

BACKGROUND ART

In an electric car or a hybrid car and the like, a distributive conductor for distributing electric power from an inverter to a motor for running the vehicle to be shielded. A shielded distributive conductor having a structure that collectively shields a plurality of non-shielded wires by enclosing them in a shielding member or braided wires, which is formed by braiding thin metallic wires into a mesh tubular shape, has been practically realized. Such a distributive conductor configured to be shielded with braided wires, however, has a problem because it is necessary to enclose the entire distributive conductor in a protector made of resin in order to protect the braided wires and the insulated wires, which results in an increase in the number of parts and assembling steps because of use of the protector.

The applicants of the present application thus proposed a structure to insert non-shielded wires into a metal pipe, as described in Japanese Patent Application No. 2004-171952. According to this structure, the pipe is effective in a shielding function for the wires and in a protecting function for the wires. This structure thus has the advantage over the structure of the shielded distributive conductor using braided wires and a protector in that it needs less number of parts.

The distributive conductor having a pipe and insulated wires inserted therein, however, cannot avoid intervention of air space between the insulated wires and the pipe. Thus, heat generated when electric current flows through the wires is insulated by the air, which has low thermal conductivity, and is difficult to be transferred to the pipe. Furthermore, since the pipe has no air pathway for accessing the interior with the exterior, which braided wires would have between the mesh, heat generated in the wires tends to be stored inside the pipe and heat dissipation tends to be low.

As a predetermined current is passed through a conductor, the larger cross-sectional area of a conductor allows for minor heat generation. On the other hand, the higher heat dissipation of a conductor allows for minor temperature increase value of the conductor caused by heat generation. Accordingly, in an environment where an upper limit is provided for temperature increase value of a conductor, the cross-sectional area of the conductor in such a shielded distributive conductor of lower heat dissipation efficiency (as explained above) should be large so that the heat generation is minor.

Enlargement of the cross-sectional area of the conductor, however, means enlargement in diameter and weighting of the shielded distributive conductor. Some countermeasure thus becomes necessary.

Thus, there is a need in the art for an improved heat dissipation of a shielded distributive conductor using a pipe.

SUMMARY OF THE PRESENT INVENTION

In the present invention, a distributive conductor is formed by accommodating an insulated wire for supplying a motor for running a vehicle and the like with electric power in a metal pipe. The inner circumferential wall of the pipe is provided with a low heat-reflective layer of lower heat reflectivity than the material of the pipe, thereby increasing the heat absorption thereof so that heat generated in the insulated wire is effectively dissipated out of the pipe.

Furthermore, it is preferable that an outer circumferential wall of the pipe is provided with a heat dissipative layer that has higher heat dissipativity than the material of the pipe.

In these inventions, it is more preferable that the low heat reflective layer and/or the heat dissipative layer may be constituted by painted layers/a painted layer, which are/is black colored.

According to the present invention, heat radiated from the insulated wire is absorbed into the low heat-reflective layer of low heat reflectivity, efficiently transferred to the pipe, and dissipated from the pipe to the exterior, thereby temperature increase is able to be suppressed. In addition, in the distributive conductor with the structure that the outer circumferential wall of the pipe is provided with the heat dissipative layer, the heat dissipation property from the outer circumferential wall of the pipe is improved, which enables further suppression of temperature increase, and thus enables use of wires of smaller cross-sectional area.

EXPLANATION OF NUMERALS

Wa, Wb, Wc . . . shielded distributive conductors
10 . . . an insulated wire
20 . . . a pipe
21 . . . a low heat-reflective layer
22 . . . a heat dissipative layer

BEST MODE FOR CARRYING OUT THE INVENTION

First Embodiment

Figure 1:
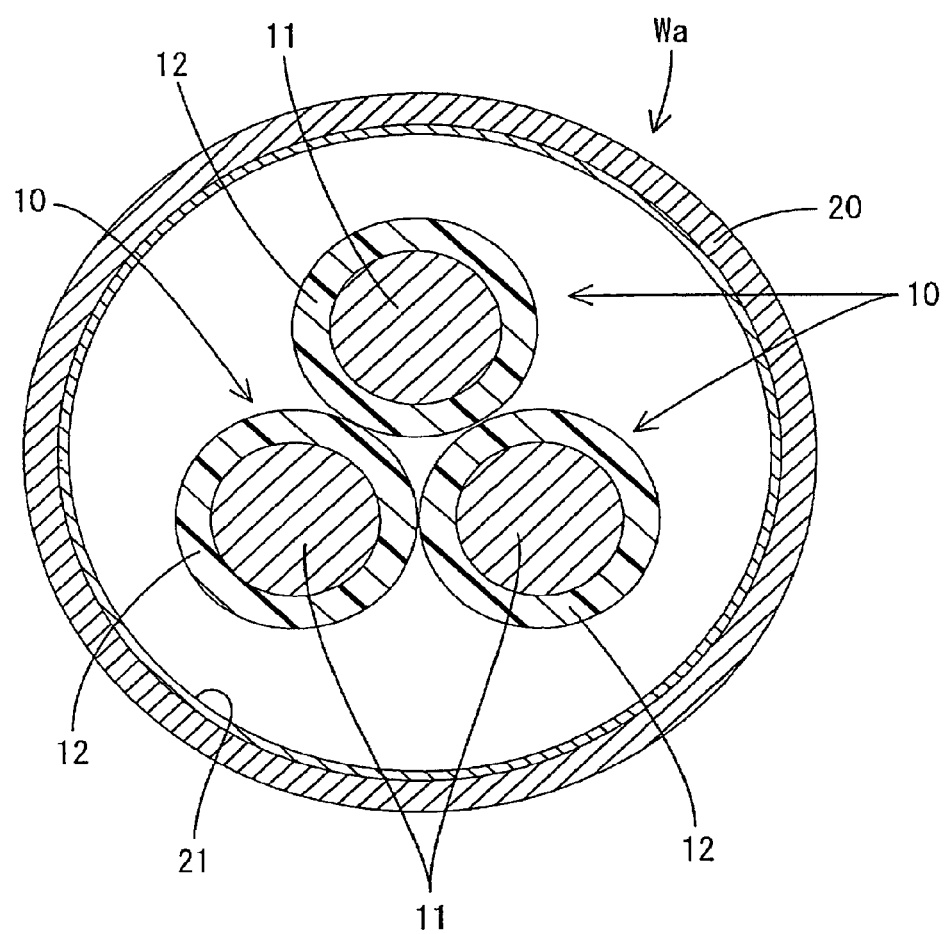
FIG. 1 is a cross-sectional view of a shielded distributive conductor according to a first embodiment.
Figure 2:
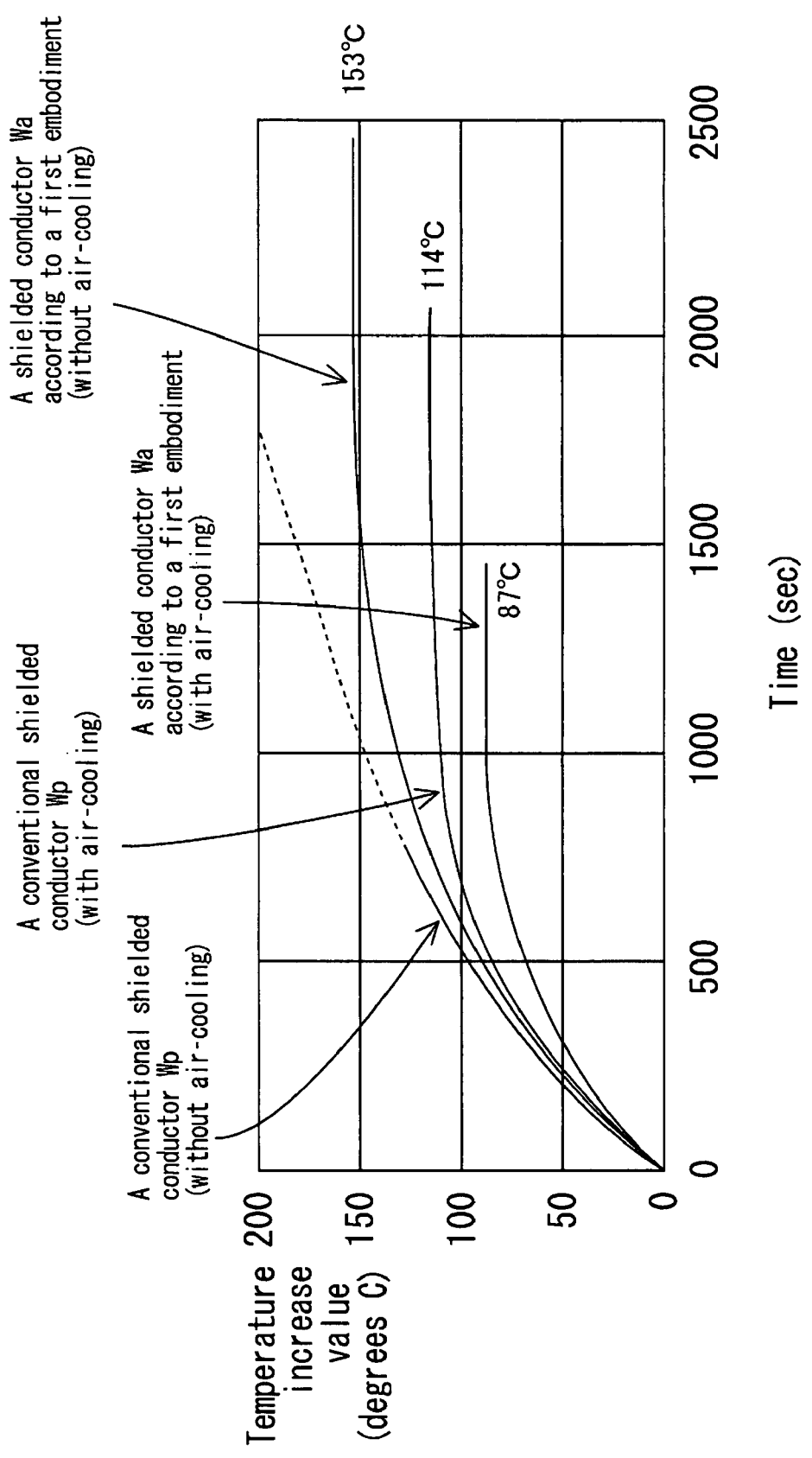
FIG. 2 is a graph showing heat dissipation performances of a conventional shielded distributive conductor and the distributive conductor according to the first embodiment.

Hereinafter, a first embodiment according to the present invention will be described with reference to FIGS. 1 and 2. A shielded distributive conductor Wa according to the present embodiment is used in, for example, an electric vehicle as a motor circuit and the like positioned between an inverter and a driving motor, both of which constitute a driving power unit. The shielded distributive conductor Wa is formed by inserting three non-shielded insulated wires 10 into a pipe 20 that performs both a collective shielding function and a protective function for wires.

Each insulated wire 10 has a configuration that a conductor 11 made of metal (e.g., aluminium alloy or copper alloy and the like) has a periphery coated by an insulating coating 12 made of resin, while the each conductor 11 includes a twisted wire, which is made by twisting a plurality of thin wires (not illustrated) in a spiral matter, or a single core wire. In a cross sectional shape of each insulated wire 10, conductor 11 and the each insulating coating 12 each have a circular shape.

The pipe 20 is made of metal (made of aluminium alloy) and has higher heat conductivity than the air. The pipe 20 has a circular cross-sectional shape similar to the insulated wires 10. The three insulated wires 10 are inserted into the pipe 20 when the pipe 20 is in a straight state. The three insulated wires 10 in the pipe 20 are arranged so as to be capable of relative displacement in a radial direction in the pipe 20, with keeping positional relation substantially in a manner such that lines that connect center points of the insulated wires 10 substantially make a triangle. That is, there is a clearance between each of the insulated wires 10, and between the insulated wires 10 and the pipe 20, and this clearance enables easy insertion of the insulated wires 10 into the pipe 20. After insertion of the insulated wires 10, the pipe 20 is bent together with the insulated wires 10.

According to the present embodiment, an inner circumferential wall of the pipe 20 is provided with a low heat-reflective layer 21 as means for improving heat dissipation efficiency for heat from the set of insulated wires 10. The low heat-reflective layer 21 is constituted by a painted layer that is formed by applying black or similar to black (e.g. black ash) paint in a uniform thickness over all the inner circumferential wall of the pipe 20, and has lower heat reflectivity (i.e. higher heat absorption performance) than the material of the pipe 20. In addition, the low heat-reflective layer 21 is unicolor over all the inner circumferential wall of the pipe 20.

In the shielded distributive conductor Wa according to the present embodiment, heat generated in the insulated wires 10 and radiated from a periphery of the insulating coating 12 is absorbed into the low heat-reflective layer 21, transferred from the outer periphery of the low heat-reflective layer 21 to the inner circumferential wall of the pipe 20, and then dissipated from the outer circumferential wall of the pipe 20 into atmosphere. Since the low heat-reflective layer 21 is black colored or similar to black colored over the inner periphery thereof, it is effective in the function of heat absorption similar to a black body that would absorb heat without substantially reflecting it. Accordingly, by comparison with a structure that has no low heat-reflective layer 21 and the material of the pipe 20 directly opposes to the insulated wires 10, the structure according to the present embodiment has advantages in the performance for dissipating heat generated in the insulated wires 10 through the pipe 20 to the exterior.

In addition, the low heat-reflective layer 21 may be a structure that a cylinder (not illustrated), manufactured as a separate parts from the pipe, is assembled over the inside of the pipe 20. In the present embodiment, however, since the low heat-reflective layer 21 is a painted layer applied over the inner circumferential wall of the pipe 20, what is necessary to form the low heat-reflective layer 21 is only to apply paint over the inner circumferential wall of the pipe 20. Therefore, it does not cause increase of the number of parts.

Figure 6:
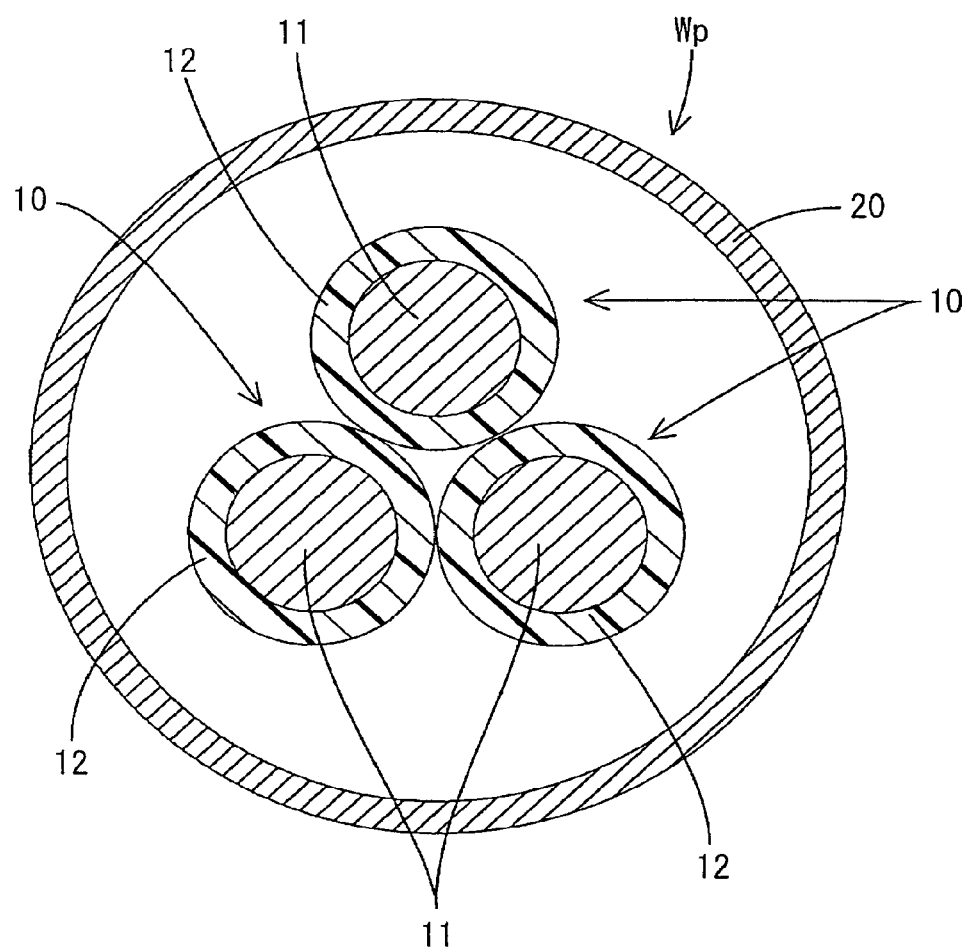
FIG. 6 is a cross-sectional view of the conventional shielded distributive conductor.

The shielded distributive conductor Wa according to the present embodiment has the advantage in heat dissipation performance, as described above. FIG. 2 shows, in graph form, results of experiments comparing the heat dissipation performance of a conventional shielded distributive conductor Wp having no low heat-reflective layer 21 (having a same structure as that of the shielded distributive conductor of the present embodiment 1 Wa, except not having the low heat-reflective layer 21), as shown in FIG. 6, with the heat dissipation performance of the shielded distributive conductor Wa having the low heat-reflective layer 21 according to the present first embodiment. The insulated wires 10 and the pipe 20 of the conventional shielded distributive conductor Wp and those of the shielded distributive conductor according to the present embodiment Wa were manufactured with same materials respectively. The conductors 11 of the insulated wires 10 were 2.6 mm dia (per one conductor), while the pipe 20 was 15 mm external diameter. In addition, the material of the pipe 20 was aluminium alloy, and the surfaces of the raw material were silver colored. Current of 60 ampere was continuously passed through the insulated wires 10, and the temperature increase value from the state before conducting was monitored. The temperature monitoring point was a bound in the insulated wires 10 between the periphery of the conductor 11 and the inner periphery of the insulating coating 12. In addition, in the experiments, a comparison of a condition where the pipe 20 was air-cooled by air-blowing the outer circumferential wall of the pipe 20 with a condition where the pipe 20 was not air-blown was also performed.

A first comparison was performed under the condition without air-cooling. At the point when approximately 600 sec. passed, the temperature increase value in the conventional shielded distributive conductor Wp reached 120 degrees C. Since there was a concern that the temperature increase value in the insulated wires 10 might exceed 200 degrees C. to burn the insulated wires 10 if the electric current would continue to flow, the electric flow was ceased in mid-course. Meanwhile, in the shielded distributive conductor according to the present embodiment that has the low heat-reflective layer 21 inside the pipe 20, the temperature increase value was suppressed at 153 degrees C. under the same condition.

Another comparison was performed under the condition with air-cooling. At the point where approximately 1500 sec. passed, the temperature increase value in the conventional shielded distributive conductor Wp was 114 degrees C., while, in the shielded distributive conductor Wa according to the present embodiment, the temperature increase value was suppressed at 87 degrees C. That is, the temperature increase value in the shielded distributive conductor Wa according to the present embodiment was suppressed lower by 27 degrees C. in comparison with the temperature increase value in the conventional shielded distributive conductor Wp, and this thermal difference by 27 degrees C. was recognized as a heat dissipation performance by the low heat-reflective layer 21. In addition, in comparison of the condition with air-cooling with the condition without air-cooling, it was recognized that the temperature increase value under the condition with air-cooling was suppressed lower by 66 degrees C.

An effect of improvement in the heat dissipation performance as described above is a light weight shielded distributive conductor Wa. That is, when a predetermined current is passed through the insulated wires 10 (the conductors 11), the smaller cross-sectional area of the conductors 11 causes larger amount of heat generated in the insulated wires 10; while superior heat dissipation, as the present embodiment has, enables lower temperature increase in the insulated wires 10 even if the amount of heat generated in the insulated wires 10 is larger. Accordingly, under such an environment where high current is passed, e.g. when supplying a driving motor of an electric vehicle with electric power, and an upper limit is provided on temperature increase value in the insulated wires 10, the allowable amount of heat generation in the insulated wires 10 is relatively enlarged by changing the conventional shielded distributive conductor Wp for the shielded distributive conductor Wa according to the present embodiment that is superior in heat dissipation. Then, relative enlargement of allowable heat generation amount in the insulated wires 10 means that the minimum cross-sectional area of a conductor 11 applicable under the environment where an upper limit is provided for the temperature increase value in the insulated wires 10 may be minified; and minimizing the cross-sectional area of the conductor 11 enables the shielded distributive conductor Wa to be lighter and its diameter to be reduced.

Second Embodiment

Figure 3:
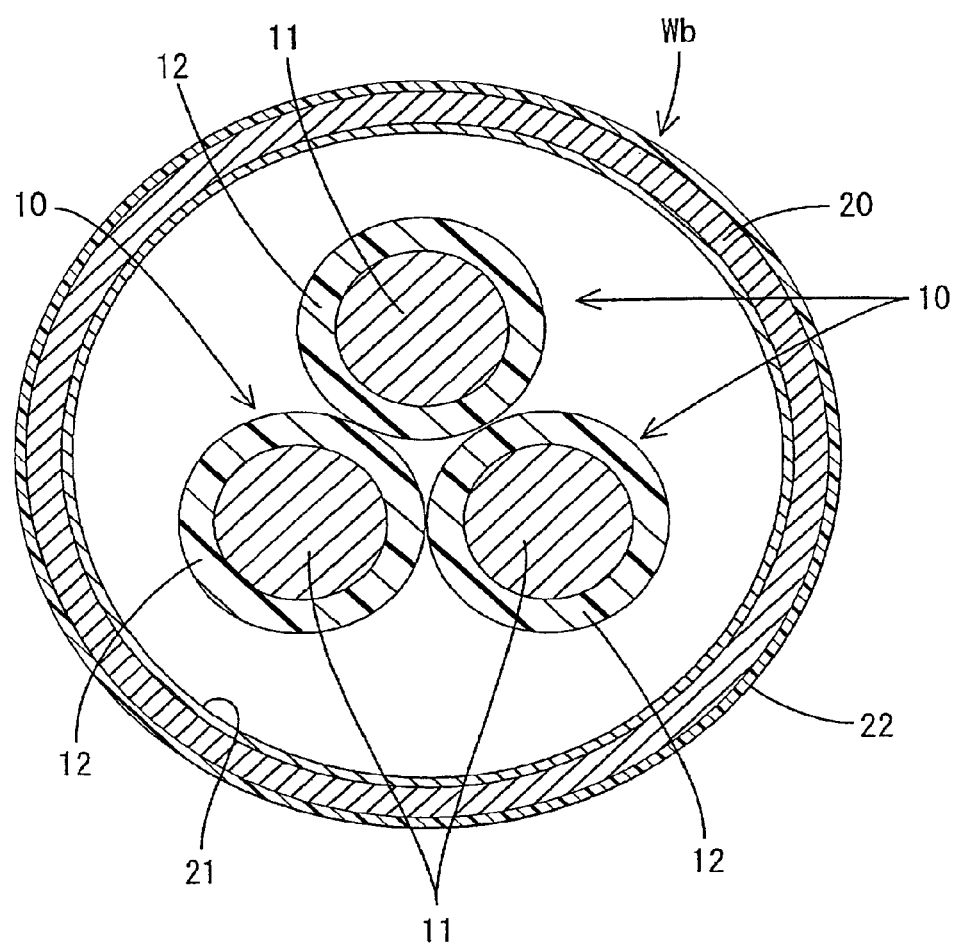
FIG. 3 is a cross-sectional view of a shielded distributive conductor according to a second embodiment.
Figure 4:
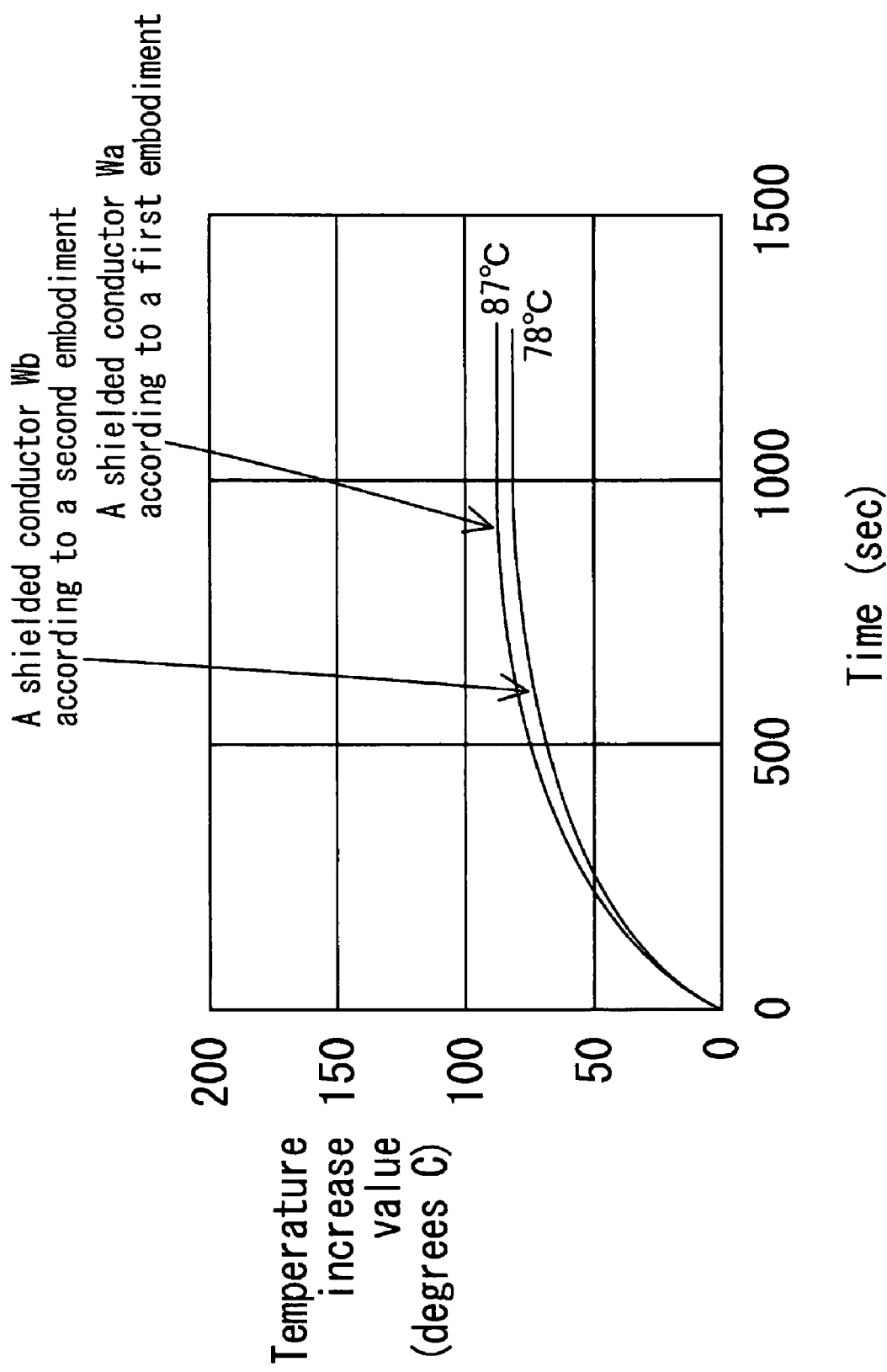
FIG. 4 is a graph showing heat dissipation performances of the shielded distributive conductor according to the second embodiment and the shielded distributive conductor according to the first embodiment.

A second embodiment is next described with reference to FIGS. 3 to 4. In a shielded distributive conductor Wb according to the present second embodiment, an inner circumferential wall of a pipe 20 is provided with a low heat-reflective layer 21, and an outer circumferential wall of the pipe 20 is provided with a heat dissipative layer 22. Both the low heat-reflective layer 21 and the heat dissipative layer 22 perform as means for improving the heat dissipation efficiency. Each of the low heat-reflective layer 21 and the heat dissipative layer 22 is constituted by a painted layer that is formed by applying black or similar to black (e.g. black ash) paint in a uniform thickness over all the inner or outer circumferential wall of the pipe 20. The low heat-reflective layer 21 is effective in higher heat absorption performance than the pipe 20, while the heat dissipative layer 22 is effective in higher heat radiation performance than the pipe 20. In addition, the low heat-reflective layer 21 is unicolor over all the inner circumferential wall of the pipe 20, while the heat dissipative layer 22 is unicolor over all the outer circumferential wall of the pipe 20. Other constructions are the same as that of the above-described first embodiment, and therefore the same constructions are designated by the same numerals while the explanation of the structure, the operation and effect are omitted.

In the shielded distributive conductor Wb according to the present second embodiment, heat generated in the covered wires 10 and radiated from the periphery of the insulating coatings 12 is absorbed into the low heat-reflective layer 21, transferred from an outer periphery of the low heat-reflective layer 21 to an inner circumferential wall of the pipe 20, transferred from an outer circumferential wall of the pipe 20 to an inner periphery of the heat dissipative layer 22, and dissipated from the outer periphery of the heat dissipative layer 22 to atmosphere. Since the low heat-reflective layer 21 and the heat dissipative layer 22 are black colored or similarly to black colored over the peripheries thereof, they are effective in the function of heat absorption similar to a black body that would perfectly absorb heat and in the function of heat dissipation similar to a black body that would effectively radiate heat. Accordingly, by comparison with a conventional shielded distributive conductor Wp that has no low heat-reflective layer 21 and the inner circumferential wall of the pipe 20 directly opposes the wires 10, and that has no heat dissipative layer 22 and the outer circumferential wall of the pipe 20 is exposed to atmosphere, the shielded distributive conductor Wa according to the present second embodiment performs superior dissipation of heat generated in the insulated wires 10.

In addition, the low heat-reflective layer 21 and the heat dissipative layer 22 may be a structure that cylinders (not illustrated), manufactured as a separate part from the pipe 20, are assembled over the inner and outer circumferential walls of the pipe 20. In the present embodiment, however, since what is necessary is only to apply paint over the circumferential walls of the pipe 20, it does not cause increase of the number of parts.

As described above, the shielded distributive conductor Wb according to the present second embodiment is superior in the heat dissipation efficiency. FIG. 4 shows in graph form a results of experiments comparing the heat dissipation performance of a shielded distributive conductor Wa having only a low heat-reflective layer 21, according to the first embodiment, with the heat dissipation performance of a shielded distributive conductor Wb having both a low heat-reflective layer 21 and a heat dissipative layer 22 according to the present second embodiment. The insulated wires 10 and the pipe 20 of the shielded distributive conductor Wa according to the first embodiment were same with the respective ones of the shielded distributive conductor Wb according to the present second embodiment. The conductors 11 of the insulated wires 10 were 2.6 mm dia (per one conductor), while the pipe 20 was 15 mm external diameter. In addition, the material of the pipe 20 was aluminium alloy, and its surfaces were silver colored. Current of 60 ampere was continuously passed through the insulated wires 10, and the temperature increase value from the state before conducting was monitored. The temperature monitoring point was a bound in the insulated wires 10 between the periphery of the conductor 11 and the inner periphery of the insulating coating 12. In addition, in the experiments, the pipe 20 was air-cooled by air-blowing the outer circumferential wall of the pipe 20.

As a result of the experiments, it was proved that at the point when approximately 1000 sec. passed, the temperature increase value in the shielded distributive conductor Wa according to the first embodiment was 87 degrees C., while the temperature increase value in the shielded distributive conductor Wb according to the present second embodiment was suppressed at 78 degrees C. That is, the temperature increase value in the shielded distributive conductor Wb according to the present second embodiment was suppressed lower by 9 degrees C. in comparison with the heat increasing value in the shielded distributive conductor Wa according to the first embodiment, and this thermal difference by 9 degrees C. was recognized as a heat dissipation performance by the heat dissipative layer 22.

Third Embodiment

Figure 5:
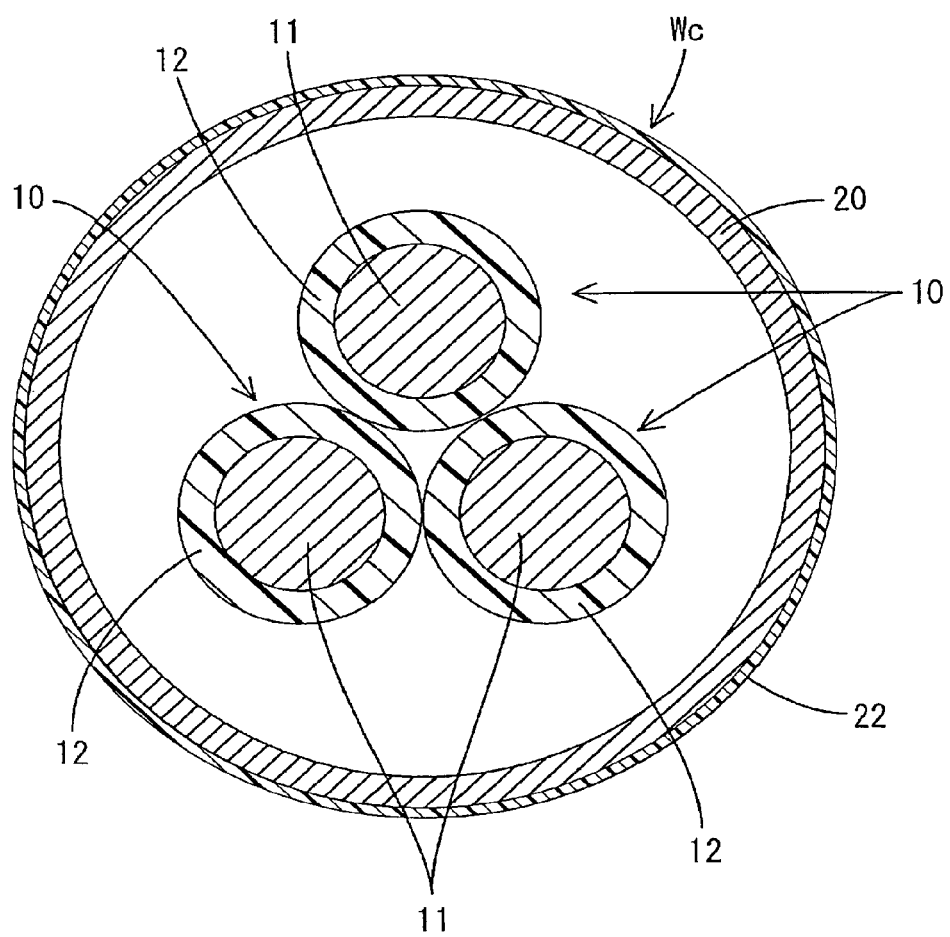
FIG. 5 is a cross-sectional view of a shielded distributive conductor according to a third embodiment.

Next, a third embodiment according to the present invention is described with reference to FIG. 5. In a shielded distributive conductor Wc according to the present third embodiment, an outer circumferential wall of a pipe 20 is provided with a heat dissipative layer 22 as means for improving heat dissipation efficiency. The heat dissipative layer 22 is constituted by a painted layer that is formed by applying black or similar to black (e.g. black ash) paint in a uniform thickness over all the outer circumferential wall of the pipe 20, and is effective in higher heat radiation performance than the pipe 20. The low heat dissipative layer 22 is unicolor over all the outer circumferential wall of the pipe 20. Other constructions are the same as that of the above-described first embodiment, and therefore the same constructions are designated by the same numerals while the explanation of the structure, the operation and effect are omitted.

In the shielded distributive conductor Wc according to the present third embodiment, heat generated in insulated wires 10 are transferred to an inner circumferential wall of the pipe 20, transferred from an outer circumferential wall of the pipe 20 to an inner periphery of the heat dissipative layer 22, and then dissipated from an outer periphery of the heat dissipative layer 22 to atmosphere. Since the outer periphery of the heat dissipative layer 22 is black colored or similar to black colored, it is effective in the function of heat dissipation similar to a black body that would effectively radiate heat. Accordingly, in comparison with a conventional shielded distributive conductor Wp that has no heat dissipative layer 22 and the outer circumferential wall of the pipe 20 is exposed to atmosphere, it performs superior dissipation of heat generated in the insulated wires 10.

In addition, the heat dissipative layer 22 may be a structure that a cylinder (not illustrated), manufactured as a separate parts from the pipe 20, is assembled over the outer circumferential wall of the pipe 20. In the present embodiment, however, since the heat dissipative layer 22 is configured to be a painted layer that is applied over the outer circumferential wall of the pipe 20, what is necessary for forming the heat dissipative layer 22 is only to apply paint over the outer circumferential wall of the pipe 20. Accordingly, it does not cause increase of the number of parts.

Other Embodiments

The present invention is not limited to the embodiments explained in the above description made with reference to drawings, but the following embodiments may be included in the technical scope of the present invention, for example.

(1) In the above embodiments, a configuration that three wires are inserted into a single pipe is shown. However, according to the present invention, the number of wires inserted into a single pipe may be either of one, two, four or more.

(2) In the above embodiments, the wires are inserted into the pipe and thereafter the pipe together with the wires is bent. However, according to the present invention, it may be that the pipe is bent and then the wires are inserted therein.

(3) In the above embodiments, the wires are disposed in a header bond manner in the pipe. However, according to the present invention, the wires may be disposed in a line or in a matrix.

(4) In the above embodiments, the pipe has a circular cross sectional shape. However, according to the present invention, the cross sectional shape of the pipe may be noncircular (elongated, oval, or substantially polygonal shape including trapezoidal or parallelogram and the like).

(5) In the above embodiments, the low heat-reflective layer and the heat dissipation layer are painted layers. However, according to the present invention, it may be that the low heat-reflective layer or the heat dissipation layer is a cylinder that is manufactured as a separate parts from the pipe and is assembled over the inside of the pipe.

(6) In the above embodiments, the low heat-reflective layer and the heat dissipation layer are formed over all the inner circumferential wall of the pipe. However, according to the present invention, these may be formed only partially on the inner or outer circumferential wall of the pipe.

(7) In the above embodiments, the heat reflective layer is unicolor over all the pipe. However, according to the present invention, it may be varied with portions.

(8) In the above embodiments, the material of the pipe is aluminium alloy. However, according to the present invention, the pipe may be a metal such as copper alloy or stainless alloy and the like other than aluminium.

(9) In the above embodiments, the low heat-reflective layer and the heat dissipation layer are arranged to be black colored or similar to black colored, thereby being effective in higher heat absorption or heat dissipation. However, according to the present invention, the low heat-reflective layer or the heat dissipation layer may be configured by applying or assembling over the pipe paint or a parts which inner color does not fall in the category of black or similar to black but which has a comparable heat absorption performance or heat dissipation performance with those which inner periphery is black or similar to black. Furthermore, the low heat-reflective layer or the heat dissipation layer is of course not prohibited to have other additional functions and, for example, it may be arranged to contain ferrite powder that is superior in electromagnetic shield performance to have both the low heat-reflection or heat-dissipation performance and the electromagnetic shield performance.

The invention claimed is:

1. A distributive conductor for supplying electric power for a motor for running a vehicle, the distributive conductor comprising:
   a pipe made of metal; and
   an insulated wire positioned in the pipe such that air space intervenes between the insulated wire and an inner circumferential wall of the pipe;
   wherein a low heat-reflective layer is positioned on the inner circumferential wall of the pipe, the low heat-reflective layer having lower heat reflectivity than that of the pipe, thereby increasing heat absorption and effectively dissipating heat generated in the insulated wire out of the pipe;
   wherein the low heat-reflective layer is a layer of paint.

2. A distributive conductor for supplying electric power for a motor for running a vehicle, the distributive conductor comprising:
   a pipe made of metal; and
   an insulated wire positioned in the pipe such that air space intervenes between the insulated wire and an inner circumferential wall of the pipe;
   wherein a heat dissipative layer is positioned on an outer circumferential wall of the pipe, the heat dissipative layer capable of dissipating heat more than that of the pipe, thereby increasing heat dissipation from the wire to out of the pipe;
   wherein the heat dissipative layer is a layer of paint.

3. A distributive conductor for supplying electric power for a motor for running a vehicle, the distributive conductor comprising:
   a pipe made of metal; and
   an insulated wire positioned in the pipe such that air space intervenes between the insulated wire and an inner circumferential wall of the pipe;
   wherein a low heat-reflective layer is positioned on the inner circumferential wall of the pipe, the low heat-reflective layer having lower heat reflectivity than that of the pipe;
   wherein a heat dissipative layer is positioned on an outer circumferential wall of the pipe, the heat dissipative layer capable of dissipating heat more than the pipe, thereby increasing heat dissipation from the insulated wire to out of the pipe;
   wherein at least one of the low heat-reflective layer and the heat dissipative layer is a layer of paint.

4. The distributive conductor according to claim 3, wherein the layer of paint is black.

5. The distributive conductor for supplying electric power for a vehicle, the distributive conductor comprising:
   a pipe;
   an insulated wire in the pipe, wherein a low heat-reflective layer is positioned on an inner circumferential wall of the pipe, and the low heat-reflective layer having lower heat reflectivity than the pipe; and
   a heat dissipative layer positioned on the outer circumferential wall of the pipe, the heat dissipative layer capable of dissipating heat more than the pipe;
   wherein at least one of the low heat-reflective layer is a layer of paint.

* * * * *